United States Patent
Saito et al.

(10) Patent No.: US 6,589,582 B2
(45) Date of Patent: Jul. 8, 2003

(54) METHOD FOR PRODUCTION OF BAKED, FRIED OR STEAMED GOODS

(75) Inventors: Hirohiko Saito, Osaka (JP); Norihiro Kanaya, Sakai (JP); Etsuko Homma, Takatsuki (JP); Shuichi Murata, Takaishi (JP)

(73) Assignee: Okumoto Flour Milling Co., Ltd., Osaka (JP)

( * ) Notice: Subject to any disclaimer, the term of this patent is extended or adjusted under 35 U.S.C. 154(b) by 228 days.

(21) Appl. No.: 09/887,319

(22) Filed: Jun. 25, 2001

(65) Prior Publication Data

US 2002/0031575 A1 Mar. 14, 2002

(30) Foreign Application Priority Data

Jul. 19, 2000 (JP) ........................................ 2000-218785

(51) Int. Cl.⁷ ................................................. A21D 8/02
(52) U.S. Cl. ....................................................... 426/504
(58) Field of Search ............................ 426/19, 27, 549, 426/18, 391, 496, 504

(56) References Cited

FOREIGN PATENT DOCUMENTS

JP    2000-245332    9/2000

OTHER PUBLICATIONS

Pan Gijyutsu, No. 471, "Reconstruction of Method for Kneading by the Use of Hot Water", published by Nippon Pangiyutsu Kenkyusho on Nov. 1998.

Primary Examiner—Keith Hendricks
(74) Attorney, Agent, or Firm—Wenderoth, Lind & Ponack, L.L.P.

(57) ABSTRACT

Baked, fried or steamed goods or foodstuffs exerting wheat flour's specific flavor and taste and having a unique flavor can be made characteristically through a process comprising a first step of preparing first a basic dough by mixing wheat flour and water and kneading the mixture under heating to give a basic dough having a temperature of around 55 to 98° C., an additional step of preparing a finished dough by mixing the basic dough, wheat flour and auxiliary materials containing yeast and subsequently kneading the mixture, and a last step of subjecting the finished dough to fermentation and subsequently baking, frying or steaming the fermented dough into baked, fried or steamed goods or foodstuffs.

6 Claims, No Drawings

METHOD FOR PRODUCTION OF BAKED, FRIED OR STEAMED GOODS

BACKGROUND OF THE INVENTION

1. Field of the Invention

The present invention relates to a method for the production of baked, fried or steamed goods or foodstuffs such as bread, sweet buns, rolled buns, Chinese buns, yeast raised doughnuts and the like made from wheat flour.

2. Description of the Prior Art

Baked goods such as bread, sweet buns, rolled buns, Chinese buns, yeast doughnuts and the like made from wheat flour are usually made by the first step of adding all or a part of yeast and various kinds of auxiliary materials to about 70% by weight of wheat flour in relation to the total amount of flour used and then mixing and kneading them together with ordinary water at ambient temperature thoroughly to give a basic dough for the preparation of a finished dough; the second step of subsequently supplementing the remaining flour and various kinds of auxiliary materials containing yeast to the basic dough, followed by mixing with ordinary water at ambient temperature and kneading to make the finished dough and the final step of fermenting the finished dough, followed by baking.

In order to improve the qualities and characteristics of the baked goods, various kinds of auxiliary materials are added to wheat flour. For instance, an emulsifier such as stearic acid monoglyceride, diacetyl tartaric acid monoglyceride, sugar-ester, calcium stearoyl lactylate and the like is added to soften the taste of the baked goods, while a viscosity improver is supplemented to enhance the moisture preservability.

The official gazette of Japanese Unexamined Patent Publication No. HEI11-56219 discloses a method for the production of baked goods by using various kinds of oxidizing agents (potassium bromate, potassium iodate, ammonium persulfate, etc.), reducing agents(cysteine and so on), and enzymes (glucose oxidase, catalase), in order to improve the quality of baked goods.

SUMMARY OF THE INVENTION

Recently, as materials for foodstuffs have been diversified, consumers' tastes on baked, fried or steamed goods exemplified hereinabove have been also diversified. Thus there has been expected to develop baked, fried or steamed goods which exert novel flavor, taste and texture. However it is appreciated that when various kinds of auxiliary materials are added to wheat flour, the natural flavor and taste of the flour might be damaged and further the economical efficiency might greatly be reduced sometimes due to the kind of the auxiliary materials and the amount added.

In the present invention, the use of said auxiliary materials other than yeast is optional. Nevertheless the present invention provides a new method for the production of baked, fried or steamed goods which exert the flavor and taste of natural wheat flour and which also have uniquely a refreshingly moist and chewy texture or sticky texture as well as a soft and agreeable taste. The method is at the same time economical with low production cost.

The method for the production of baked, fried or steamed goods of the present invention is characterized in that it comprises a first step of preparing a basic dough by mixing wheat flour and water and kneading the mixture under heating to give a basic dough having a temperature of around 55 to 98° C., an additional step of preparing a finished dough by mixing the basic dough, wheat flour and auxiliary materials containing yeast and subsequently kneading the mixture, and a final step of subjecting the finished dough to fermentation and subsequently baking, frying or steaming the fermented dough into baked, fried or steamed goods. According to the present invention, the auxiliary materials other than yeast are not always necessary for kneading the basic dough. The auxiliary materials which can be used in the present invention include the above exemplified emulsifiers or surfactants, oxidizing agents, reducing agents, enzymes or other known additives such as sugar, salt, dry milk, shortening, etc. However, addition of yeast is essential.

As to the first step, heating is preferably carried out before kneading, most preferably after mixing and before kneading, although heating may be carried out during mixing and kneading.

Said basic dough can be made by mixing a portion of wheat flour with hot water, e.g. boiling water and kneading the mixture. Namely heat can be supplied by the use of boiling water.

It can be made by mixing and kneading a portion of wheat flour with ordinary water at ambient temperature and heating the mixture during mixing or/and kneading.

Alternatively it can be made by mixing and kneading a portion of wheat flour with ordinary water and during mixing or/and kneading by heating the mixture in a microwave oven. In this case, heating is carried out by the use of microwave.

After cooling, said basic dough is mixed with the remaining portion of wheat flour and auxiliary materials containing yeast; the mixture is kneaded to give the finished dough; and the finished dough is fermented, followed by baking, frying or steaming to give baked, fried or steamed goods.

It can be refrigerated for preservation before subjecting to the step of preparing the final dough.

It can be frozen to be preserved before subjecting to the step of preparing the final dough.

Said basic dough can be first preserved in a refrigerator and subsequently be frozen for preservation before subjecting to the step of preparing the final dough.

Namely the method for the production of baked, fried or steamed goods or foodstuffs according to the present invention comprises the following;

(1) A method for the production of baked, fried or steamed goods or foodstuffs, characterized in that it comprises a first step of preparing a basic dough by mixing wheat flour and water and kneading the mixture under heating to give a basic dough having a temperature of around 55 to 98° C., an additional step of preparing a finished dough by mixing the basic dough, wheat flour and auxiliary materials containing yeast and subsequently kneading the mixture, and a final step of subjecting the finished dough to fermentation and subsequently baking, frying or steaming the fermented dough into baked, fried or steamed goods or foodstuffs.

(2) A method described in (1), wherein the amount of wheat flour used for kneading the basic dough is 3 to 40% by weight in relation to the total amount of wheat flour used for the production of the baked, fried or steamed goods or foodstuffs.

(3) A method described in (1), wherein the basic dough is prepared by mixing wheat flour and boiling water and kneading the mixture.

(4) A method described in (1), wherein the basic dough is prepared by mixing wheat flour and ordinary water at ambient temperature and kneading the mixture, and during mixing or/and kneading the mixture is heated.

(5) A method described in (1), wherein the basic dough is prepared by mixing wheat flour and ordinary water at ambient temperature and kneading the mixture, and during mixing or/and mixing the mixture is heated in a microwave oven.

(6) A method described in (1), wherein the basic dough is cooled after kneading in the first step and the cooled basic dough is mixed with wheat flour and the auxiliary materials to give the finished dough in the additional step.

(7) A method described in (1), wherein the basic dough is subjected to a process for making the finished dough after preservation through refrigeration and/or freezing.

(8) Baked, fried or steamed goods or foodstuffs made with the use of a basic dough having a temperature of around 55 to 80° C. prepared by mixing wheat flour and water and kneading the mixture under heating.

DETAILED DESCRIPTION OF THE INVENTION

To illustrate baked goods, bread, sweet buns, rolled buns, Chinese buns, yeast raised doughnuts and the like are exemplified.

The mode for the embodiment of the present invention is explained below.

Unlike the conventional methods for the production of baked, fried or steamed goods, according to the method for the production of baked, fried or steamed goods of the present invention, the basic dough can be obtained for example either by mixing wheat flour and boiling water, or by mixing wheat flour and water heated for example in a microwave oven, and by kneading the resulting mixture to give a basic dough having a temperature of around 55 to 98° C.

The amount of wheat flour used for kneading the basic dough comes to about 3 to 40%, preferably about 10 to 30% by weight of the total amount of wheat flour used for making the baked, fried or steamed goods; the quantity of boiling water or ordinary water is about 50 to 400% by weight in relation to 100% by weight of the wheat flour used for kneading the basic dough.

When the boiling water is employed, it is preferable to use the water heated up to an elevated temperature so that the temperature of the basic dough just prepared is in the range of about 55 to 98° C., preferably around 55 to 80° C. Particularly the boiling water includes water just after boiling or seething as a preferable example.

By using such boiling water, the baked, fried or steamed goods can be given more efficiently the flavor and taste exerted only by wheat flour. The baked, fried or steamed goods made with the use of said basic dough having the elevated temperature of around 55 to 98° C. have unexpectedly a special flavor and a refreshingly moist and chewy texture or sticky texture, which are remarkably distinct as compared with the those made with basic doughs having a temperature outside the range of about 55 to 98° C.

Further when ordinary water at ambient temperature is employed, the water is mixed with wheat flour and the mixture is heated in a microwave oven to be kneaded subsequently. In this case, wheat flour is dispersed into the ordinary water and is heated up to around 55 to 98° C. for example in a microwave oven. Then the heated mixture becomes partially semisolid, which is mixed sufficiently to be pastry and subsequently kneaded to give the basic dough having the temperature in the range of from about 55 to 80° C.

The thus obtained basic dough having the temperature in the range of about 55 to 98° C., may also be kneaded into the finished dough for example after having been preserved for four hours or more. The preservation of the basic dough not only can be carried out at ambient temperature but also may be practiced through refrigeration at a temperature of −7° C.~+10° C. without being frozen and/or freezing at a temperature below −7° C. Alternatively after having been preserved in refrigeration for four hours or more, the basic dough may further be preserved in freezing at the temperature of below −7° C.

In this way, the basic dough, which is kneaded up at about 55 to 98° C., is then cooled down, mixed and kneaded with the remaining portion of flour, the auxiliary materials containing yeast and water at an ambient temperature in the same way as the usual methods for the production of baked, fried or steamed goods or foodstuffs to give the finished dough for fermentation and baking (or frying or steaming) bread. Namely the kinds of the auxiliary materials such as sugar, salt, non-fat dry milk, shortening, raw yeast, etc. and the amount used are the same as in conventional methods for the production of baked, fried or steamed goods or foodstuffs.

The process for kneading the basic dough to give the finished dough is the same as in conventional methods for the production of baked, fried or steamed goods.

The finished dough kneaded is fermented (i.e. let rise) in the same way as conventional methods for the production of baked, fried or steamed goods and is baked, fried or steamed to a desired shape of bread, etc. In this way, there can be obtainable baked, fried or steamed goods exerting the flavor and taste of the natural wheat flour and also having a refreshingly moist and chewy texture or sticky texture as well as unique agreeableness.

EXAMPLES

Example

In relation to 100% by weight of whole wheat flour to be used for preparing loaf bread, 40% by weight of the flour was added to 20% by weight of boiling water and kneaded to give a basic dough. At the end of kneading the temperature of the basic dough is 60° C. The thus prepared basic dough was left standing at ambient temperature for 8 hours.

To the basic dough, 60% by weight of the remaining flour and auxiliary materials of sugar (5% by weight), salt (2% by weight), non-fat dry milk (2% by weight), shortening (4% by weight) and raw yeast (3% by weight) were added and then the mixture was kneaded with 60% by weight of ordinary water at ambient temperature to give a finished dough for baking bread. The finished dough was let rise according to the usual methods at 28° C. for 60 minutes and then was divided and shaped, and was subsequently let rise at room temperature of 38° C. for 60 minutes and baked for 45 minutes at 200° C. to obtain a loaf of bread finally.

Comparative Example

In relation to 100% by weight of wheat flour, 40% by weight of the flour was added to 20% by weight of ordinary water and the mixture was kneaded to give a basic dough. The kneading was carried out at 30° C. Subsequently a loaf of bread was obtained by the same blend and process as in Example.

Method for the Comparative Test

After being set aside for two hours at ambient temperature, the baked bread was put into a plastic bag to be preserved again at an ambient temperature for twenty hours. Then the comparative test was carried out by a panel of 16 females by the ages of 18 to 34 and 18 males by the ages of 22 to 43. The result of the comparative test is shown in Table 1.

TABLE 1

|  |  | Better in Example | | | Better in Comparative Example | | | The remarkable difference is not observed | | |
|---|---|---|---|---|---|---|---|---|---|---|
|  |  | Female | Male | Total | Female | Male | Total | Female | Male | Total |
| Assumed taste from outward looks (Appearance) | | 5 | 5 | 10 | 4 | 3 | 7 | 7 | 10 | 17 |
| Touch felt when grasping bread | | 12 | 11 | 23 | 2 | 3 | 5 | 2 | 4 | 6 |
| Flavor | | 11 | 10 | 21 | 1 | 2 | 3 | 4 | 6 | 10 |
| Touch on the sliced face (dampish feel) | | 10 | 12 | 22 | 3 | 2 | 5 | 3 | 4 | 7 |
| In case of eating raw bread | Dampish texture moist and chewy texture | 16 | 18 | 34 | 0 | 0 | 0 | 0 | 0 | 0 |
|  | Mellow sweetness | 14 | 16 | 30 | 0 | 0 | 0 | 2 | 2 | 4 |
| In case of eating toasted bread | Appetite | 15 | 17 | 32 | 0 | 0 | 0 | 1 | 1 | 2 |
|  | Taste | 16 | 18 | 34 | 0 | 0 | 0 | 0 | 0 | 0 |

INDUSTRIAL APPLICABILITY

According to the method for the production of baked, fried or steamed goods or foodstuffs of the present invention, baked, fried or steamed goods exerting specific flavor and taste as well as a unique palate can be obtained by mixing and kneading wheat flour with water under heating to give a basic dough having an elevated temperature of around 55 to 98° C.

What is claimed is:

1. A method for the production of baked, fried or steamed goods or foodstuffs, which comprises a first step of preparing a basic dough by mixing wheat flour and water and kneading the mixture under heating to give a basic dough having a temperature of from about 55 to 98° C., an additional step of preparing a finished dough by mixing the basic dough, wheat flour and auxiliary materials containing yeast and subsequently kneading the mixture, and a final step of subjecting the finished dough to fermentation and subsequently baking, frying or steaming the fermented dough into baked, fried or steamed goods or foodstuffs, wherein the amount of wheat flour used for kneading the basic dough is from 3 to 40% by weight in relation to the total amount of wheat flour used for the production of the baked, fried or steamed goods or foodstuffs.

2. A method as claimed in claim 1, wherein the basic dough is prepared by mixing wheat flour and boiling water and kneading the mixture.

3. A method as claimed in claim 1, wherein the basic dough is prepared by mixing wheat flour and water at ambient temperature and kneading the mixture, and during mixing or/and kneading the mixture is heated.

4. A method as claimed in claim 1, wherein the basic dough is prepared by mixing wheat flour and water at ambient temperature and kneading the mixture, and during mixing or/and kneading the mixture is heated in a microwave oven.

5. A method as claimed in claim 1, wherein the basic dough is cooled after kneading in the first step and the cooled basic dough is mixed with wheat flour and the auxiliary materials to give the finished dough in the additional step.

6. A method as claimed in claim 1, wherein the basic dough is refrigerated or frozen before making the finished dough.

* * * * *